J. HARRIS.
Bee Hive.
No. 35,426.
Patented May 27, 1862.
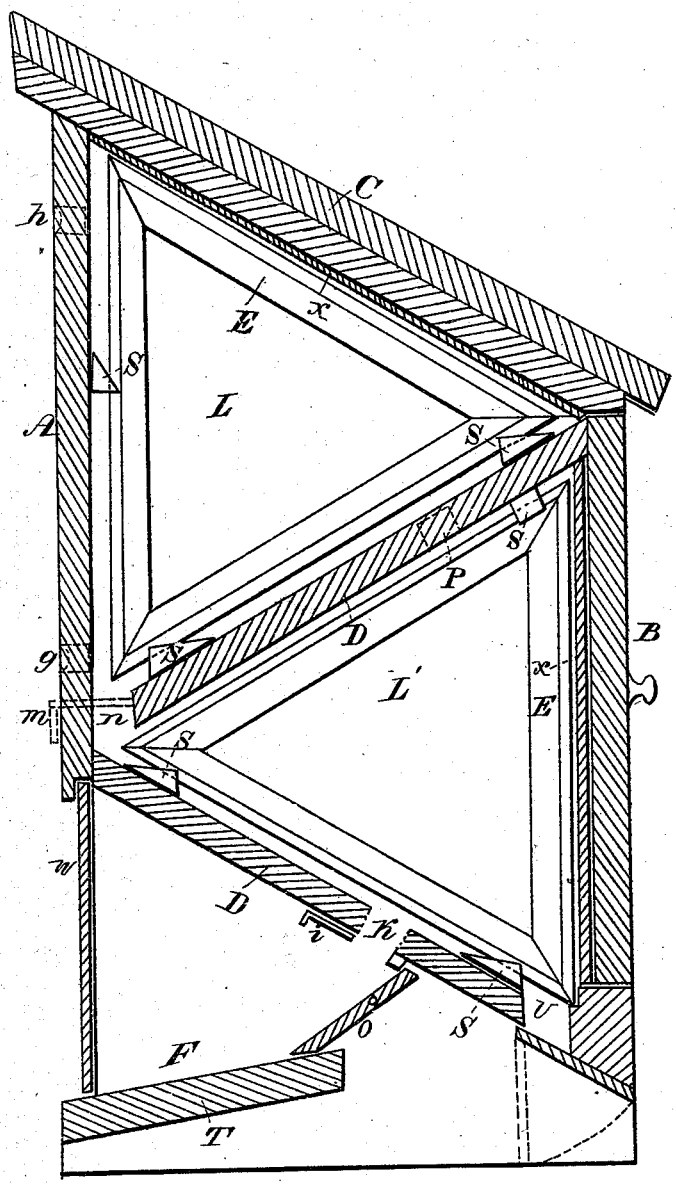
Witnesses:
A. Van Aken
John Shrap
Inventor:
Joel Harris

UNITED STATES PATENT OFFICE.

JOEL HARRIS, OF NEW CARLISLE, INDIANA.

IMPROVEMENT IN BEE-HIVES.

Specification forming part of Letters Patent No. 35,426, dated May 27, 1862.

*To all whom it may concern:*

Be it known that I, JOEL HARRIS, of New Carlisle, in the county of St. Joseph and State of Indiana, have invented a new and useful Improvement on Bee-Hives; and I do hereby declare that the following is a full, clear, and exact description of the construction and operation of the same, reference being had to the annexed drawing, making a part of this specification, in which the figure is a vertical central section.

The nature of this invention consists in combining two or more angular chambers with their movable comb-frames, or frames and honey-boxes, substantially as hereinafter described, so that ready access may be had to either chamber without disturbing the other or its contents, the bottom of each chamber being composed of a single inclined plane for the more ready escape of litter, excrementitious matter, worms, dead bees, &c.

To enable those skilled in the art to make and use my invention, I will proceed to describe its construction and operation, having reference to the drawing.

The front of the hive is shown at A. The back or rear is closed by a door, as shown at B.

The top of the hive is marked C, and the bottom of each chamber is shown by D.

The comb frames E are an equilateral triangle in shape, and so arranged in each chamber that one of their sides shall be perpendicular, and are confined in their places by notches, slats, or other similar device extending across from side to side of the hive or chambers, as shown at s.

T is the threshold or bottom board of the feeding-chamber F, which is closed by a glass or wire screen, w. The ventilator o is swung on a pivot, and also serves to foil the bee-moth.

K is the entrance for the bees, which can be closed by the slide i.

n is the space or opening between the two chambers, which may be closed by the slide m.

Within the door and beneath the top are placed glass plates for observation, x x.

v shows the trash-box, which is emptied by means of the trap r, which falls, as shown by the dotted lines.

h and p are spaces for ventilation, covered by wire-gauze or perforated plates.

g is a hole for the egress of the bees when the aperture n is closed by the slide m.

The upper chamber, L, may be filled with boxes for spare honey, or one or more boxes, and a number of frames also, if desired.

What I claim as new, and desire to secure by Letters Patent, is—

The combination of the chambers L L' with the comb-frames E E, and the single inclined plane bottoms D D with the slide m, by means of which I can close or open the communication between the two chambers L L' at pleasure, the whole being constructed and arranged in the manner and for the purpose specified.

JOEL HARRIS.

Witnesses:
   A. VAN AKEN,
   JOHN SHRAP.